US007338240B2

(12) United States Patent
Hohmann et al.

(10) Patent No.: US 7,338,240 B2
(45) Date of Patent: Mar. 4, 2008

(54) DOUBLE NUT FOR THE CONTROLLED FIXING OF A COMPONENT BY MEANS OF A BELT CONNECTION

(76) Inventors: Jörg Hohmann, Uhlandstrasse 6a, D-59872 Meschede (DE); Frank Hohmann, Josef-Menke-Strasse, D-59851 Warstein (DE)

( * ) Notice: Subject to any disclaimer, the term of this patent is extended or adjusted under 35 U.S.C. 154(b) by 0 days.

(21) Appl. No.: 10/569,355

(22) PCT Filed: Jul. 29, 2004

(86) PCT No.: PCT/EP2004/008477

§ 371 (c)(1),
(2), (4) Date: Feb. 22, 2006

(87) PCT Pub. No.: WO2005/021216

PCT Pub. Date: Mar. 10, 2005

(65) Prior Publication Data

US 2007/0020061 A1 Jan. 25, 2007

(30) Foreign Application Priority Data

Aug. 22, 2003 (DE) ................................ 103 39 201

(51) Int. Cl.
*F16B 37/00* (2006.01)
*B25B 29/02* (2006.01)

(52) U.S. Cl. ....................... 411/14.5; 411/432; 411/917

(58) Field of Classification Search ................ 411/432, 411/14.5, 434, 533, 915–917
See application file for complete search history.

(56) References Cited

U.S. PATENT DOCUMENTS

| | | | | |
|---|---|---|---|---|
| 3,435,777 | A * | 4/1969 | Schaaf | 292/256.71 |
| 4,085,649 | A * | 4/1978 | Christensson | 411/369 |
| 4,844,418 | A | 7/1989 | Cole | |
| 5,253,967 | A * | 10/1993 | Orban et al. | 411/432 |
| 5,466,107 | A * | 11/1995 | Percival-Smith | 411/546 |
| 5,538,379 | A * | 7/1996 | Junkers | 411/432 |
| 6,461,093 | B1 * | 10/2002 | Junkers | 411/432 |
| 6,685,406 | B2 * | 2/2004 | Whitney et al. | 411/14.5 |
| 6,686,527 | B2 * | 2/2004 | Hagiwara | 84/413 |

FOREIGN PATENT DOCUMENTS

| | | |
|---|---|---|
| AU | B-58372/80 | 1/1981 |
| DE | 198 47 974 | 5/2000 |
| FR | 2790 798 | 9/2000 |

* cited by examiner

*Primary Examiner*—Flemming Saether
(74) *Attorney, Agent, or Firm*—Robert W. Becker; Robert W. Becker & Assoc.

(57) ABSTRACT

A double nut for a controlled fixing of a component using a bolt connection, comprising a pulling sleeve having an internal thread adapted to be screwed onto a threaded end of a bolt, and a pressing sleeve adapted to be supported on the component. An internal thread of the pressing sleeve is adapted to be screwed onto an external thread of the pulling sleeve, and engages such external thread to such an extent that the internal thread of the pressing sleeve is spaced by a distance equaling several threads from that end of the pulling sleeve that faces the component. The external thread of the pulling sleeve is furthermore adapted to threadedly receive a pull bushing of a bolt-tightening cylinder that has a support bushing adapted to be supported on the component and to extend over the pulling sleeve and the pressing sleeve.

9 Claims, 3 Drawing Sheets

DOUBLE NUT FOR THE CONTROLLED FIXING OF A COMPONENT BY MEANS OF A BELT CONNECTION

This specification for the instant application should be granted the priority date of Aug. 22, 2003. the filing date of the corresponding German patent application 103 39 201.7, as well as the priority date of Jul. 29, 2004, the filing date of the corresponding International patent application PCT/EP2004/008477.

BACKGROUND OF THE INVENTION

The invention concerns a double nut for the controlled fixing (tightening or securing) of a part or component by means of a bolted connection. The double nut comprises a pulling sleeve with an internal thread, which can be screwed onto the threaded end of the bolt, and with an external thread onto which a pressing sleeve, which is supported on the part or component that is to be fixed by means of the bolt connection, can be screwed. The external thread of the pulling sleeve also serves to screw on a pull bushing of a hydraulic bolt-tightening cylinder, which comprises a support bushing that engages over the pulling sleeve and the pressing sleeve and is also supported on the component that is to be fixed by means of the bolted connection.

A double nut of the aforementioned kind and a hydraulic bolt-tightening cylinder that serves for tightening or fixation are described in U.S. Pat. No. 4,844,418 A. The pulling sleeve comprises an external thread that extends over the entire length of the pulling sleeve. By means of its internal thread, the pressing sleeve is screwed onto the external thread of the pulling sleeve. Likewise, the internal thread of the pressing sleeve extends over the entire length of that sleeve, and a collar or flange integrally formed with the pressing sleeve reaches underneath the pulling sleeve.

In order to tighten the bolt connection, the pull bushing of a hydraulic bolt-tightening cylinder is screwed onto the free end of the pulling sleeve and the bolt-tightening cylinder is pressurized. The support bushing is supported on a support surface of the component that is to be fixed and expands or stretches the bolt so that the pressing sleeve is lifted upwardly and away from the support surface. Subsequently, the pressing sleeve can be screwed down towards the support surface, and the collar on the pressing sleeve moves away from the corresponding end of the pulling sleeve. When the pressure in the bolt-tightening cylinder is relieved, the tension in the bolt is conveyed through the pulling sleeve, the pressing sleeve and the collar on the pressing sleeve to the support surface of the component that is to be fixed, so that the initial tension in the bolted connection is retained.

In the known embodiment of the double nut the stress on the lower threads of the pulling sleeve is significantly higher than the stress on those threads that are in the area where the thread of the pressing sleeve ends. That limits the initial tension that can be applied to the bolt connection, especially if, due to space reasons, the walls of the pulling sleeve and the pressing sleeve have to be kept thin compared to the diameter of the bolt.

It is therefore an object of the invention to configure the double nut in such a way that the distribution of stress on the threads between the pulling sleeve and the pressing sleeve is as uniform as possible in order to achieve as efficient a utilization of material as possible while the walls of the pulling sleeve and the pressing sleeve are thin.

SUMMARY OF THE INVENTION

Proceeding from that object it is proposed for a double nut of the aforementioned kind that the internal thread of the pressing sleeve engages the external thread of the pulling sleeve at a distance of at least one thread from that end of the pulling sleeve that is adjacent to the component that is to be fixed.

Tests have shown that this simple measure results in a significantly improved distribution of stress on the threads, so that even if space is limited and the walls of the pulling sleeve and the pressing sleeve are hence thin compared to the diameter of the bolt, a high initial tension can be applied and sustained by the double nut.

In order to achieve that the internal thread of the pressing sleeve engages into the external thread of the pulling sleeve at the aforementioned distance of several threads from the end of the pulling sleeve adjacent to the component that is to be fixed, the pulling sleeve and/or the pressing sleeve can be faced or recessed in the area having no mutual engagement of their threads.

According to a further embodiment, this can also be accomplished by placing a washer under the pressing sleeve, whereby the washer extends about the pulling sleeve and only the pressing sleeve is supported on it.

In that case, the height of the washer should be at least equal to the area without mutual engagement of the threads of the pulling sleeve and of the pressing sleeve, but it can also exceed that height.

In the area of the washer, the pulling sleeve can be configured without an external thread.

In order to be able to apply a sufficiently high initial tension to the bolt connection, even if the parts or components that are to be fixed are of low strength, the washer can have a larger diameter than does the pressing sleeve.

The washer can comprise a countersinking having a cylindrical inner surface that tightly extends around a cylindrical outer surface of the pressing sleeve so as to largely avoid an expanding or breaking of the pressing sleeve under pressure.

In addition to that, the washer can be formed of a high-strength material, especially if of its height corresponds only to a low number of threads.

To facilitate the mounting, the washer can magnetically stick to the pressing sleeve, which can e.g. be realized by embedding small permanent magnets into the washer or by the entire washer being permanently magnetic.

BRIEF DESCRIPTION OF THE DRAWINGS

The invention is explained in greater detail below with the aid of an embodiment shown in the drawings, in which.

DESCRIPTION OF SPECIFIC EMBODIMENTS

Figure 1:
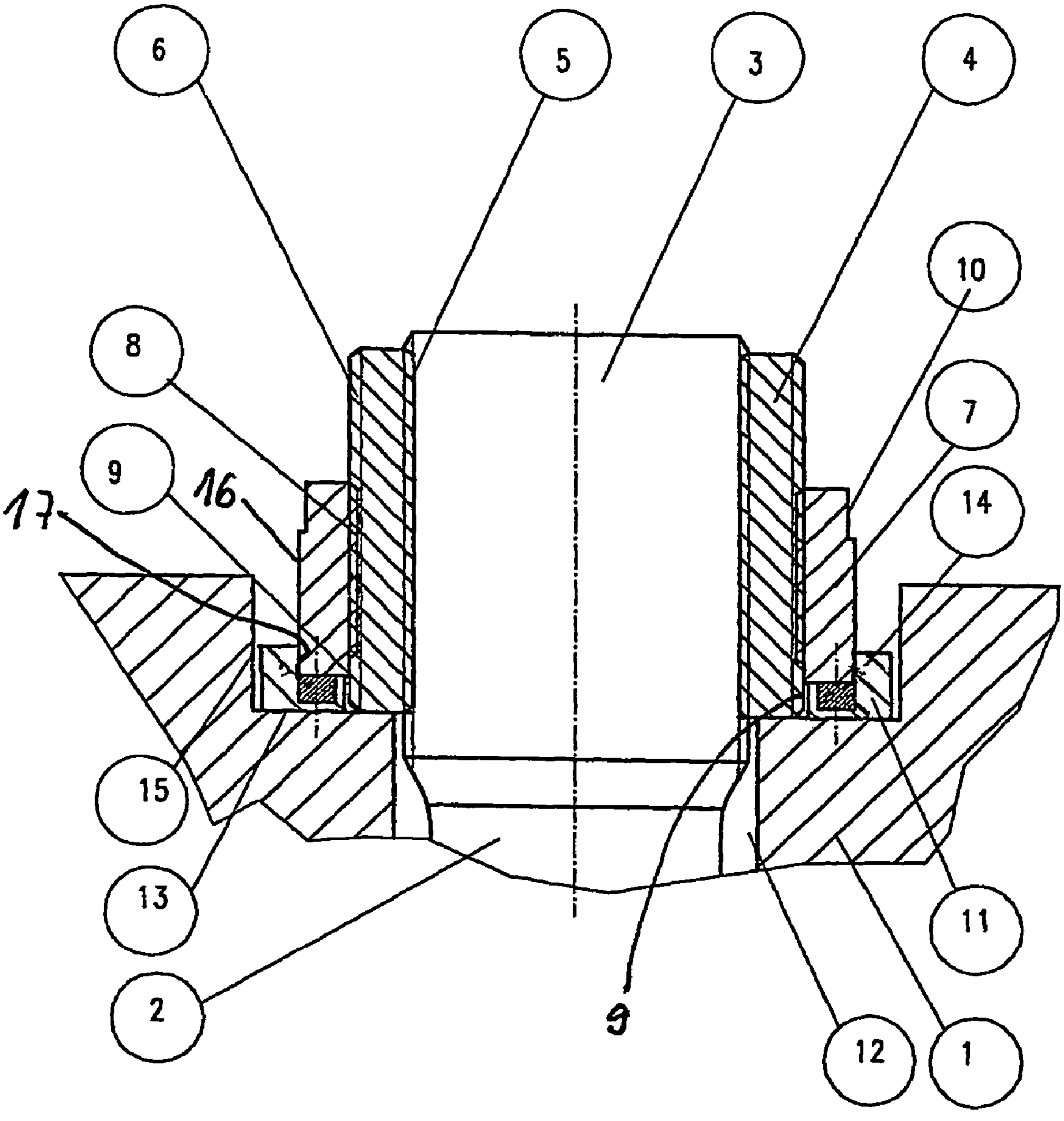
FIG. 1 shows a sectioned view of a double nut according to the invention with a washer.

A part or component 1 that is to be fixed is represented only partially with a contact surface 13 for a pressing sleeve 7 and a bore 12 for a screw-on bolt 2.

The bolt 2 has a threaded end 3 onto which a pulling sleeve 4 is screwed by means of its internal thread 5. The pulling sleeve 4 has an external thread 6 onto which a pressing sleeve 7, which comprises a cylindrical outer surface 16, is screwed by means of a corresponding intemal thread 8. A part of the external thread 6 is exposed and serves to screw on a pull bushing 24 of a hydraulic bolt-tightening cylinder 18, as it is explained below with regard to FIG. 3.

The pressing sleeve 7 is supported against a washer 11, resting in a cylindrical countersinking having an inner surface 17 of the washer 11. The washer 11 is supported on the contact surface 13 of the component 1 that is to be fixed. The cylindrical inner surface 17 of the washer 11 tightly embraces the cylindrical outer surface 16 of the pressing sleeve 7, so that, in that area, an expanding or breaking of the pressing sleeve 7 under pressure is largely avoided.

As a result of the washer 11, an area of the external thread 6 of the pulling sleeve 4 is not in engagement with the internal thread 8 of the pressing sleeve 7, so that the pulling sleeve 4 has a segment 9 that is not in engagement with the thread of the pressing sleeve 7.

The height of the segment 9 should equal at least one thread turn or thread and is e.g. determined by the height of the washer 11. The segment 9 on the pulling sleeve 4 can be configured without a thread, in other words, faced or recessed.

Figure 2:
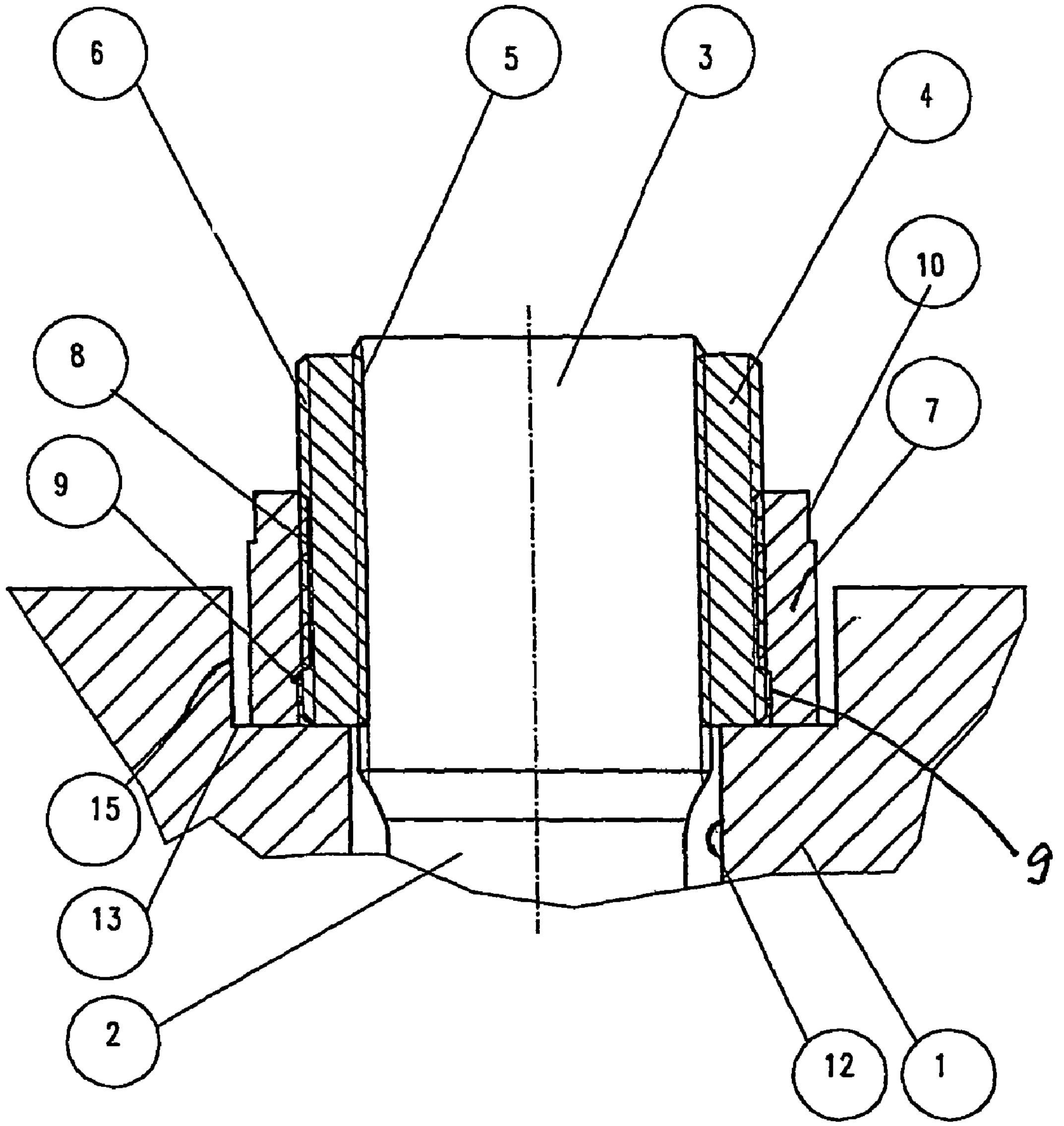
FIG. 2 shows a sectioned view of a double nut according to the invention without a washer.

The same effect can be achieved if no washer is used, as represented in FIG. 2; rather, the pressing sleeve 7 is directly supported on the contact surface 13 and at least the internal thread 8 of the pressing sleeve 7 or the external thread 6 of the pulling sleeve 4 or both are correspondingly faced or recessed.

The height of the section 9, which is determined either by the washer 11 or by the aforementioned facing, is insignificant. It has to measure at least one course of thread, but can also be considerably higher because the relieving effect for the first thread of the pulling sleeve 4 occurs in any case and the stress is distributed over a greater number of threads as in the embodiment according to the U.S. Pat. No. 4,844,418 A.

As represented, the diameter of the washer 11 can be greater than the outer diameter of the pressing sleeve 7 and can, with a small free space or play, be equivalent to the diameter of a countersinking 15. In that case, as described below, a support bushing 20 of the hydraulic bolt-tightening cylinder 18 is supported on the surface of the washer 11. If the outer diameter of the washer 11 is equal to the outer diameter of the pressing sleeve 7, which is also possible, the support bushing 20 is supported directly on the contact surface 13.

Small permanent magnets 14 are embedded in the washer 11 and facilitate mounting since the washer 11 then adheres or sticks to the pressing sleeve 7.

The same effect is achieved if the entire washer 11 is permanently magnetic.

Preferably, the washer 11 is formed of a high-strength material so that a high initial tension in the boltconnection can be realized even on a component made of lesser strength material.

Figure 3:
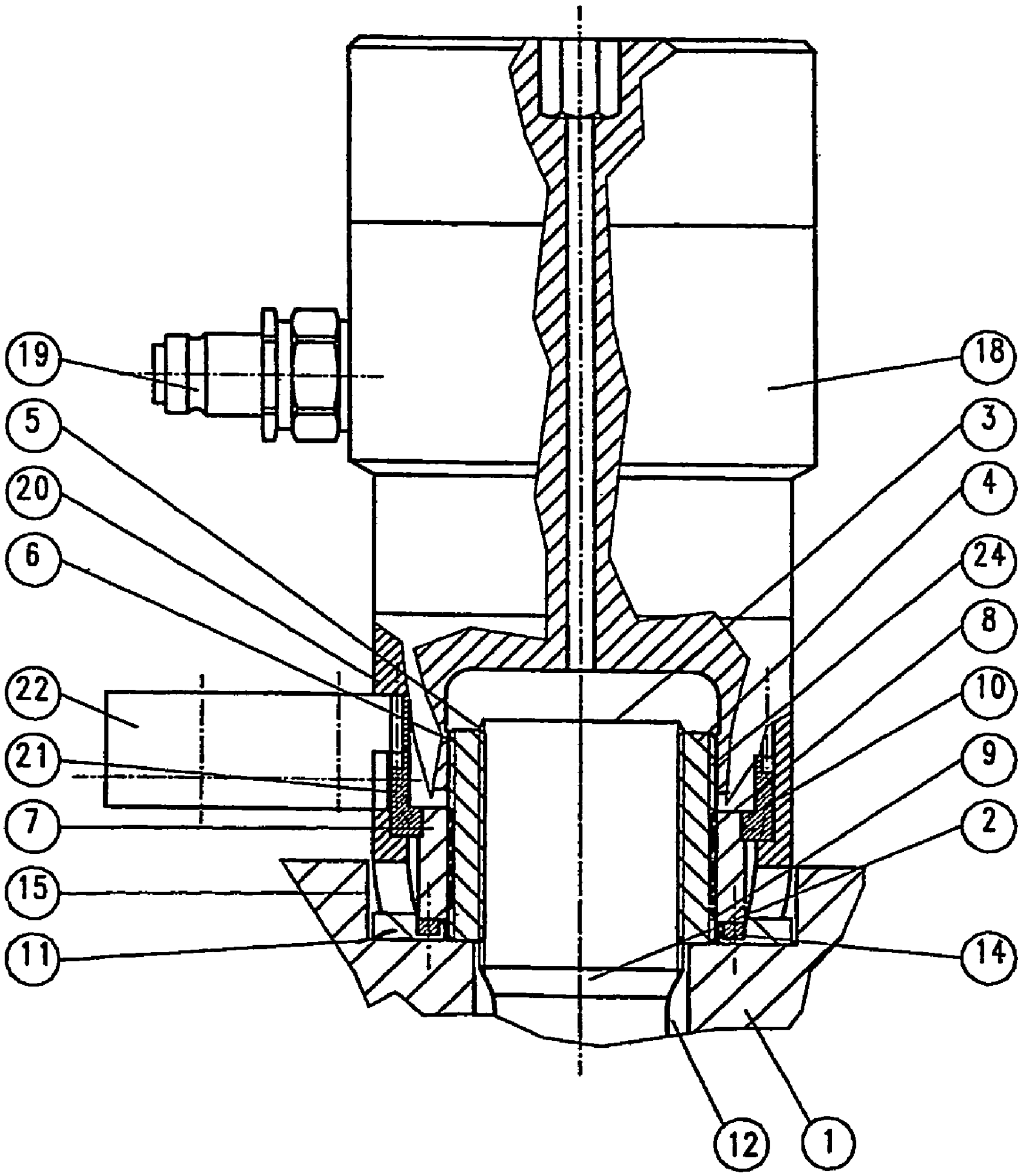
FIG. 3 shows a partially sectioned representation of the double or pulling nut according to FIG. 1 with a hydraulic bolt-tightening cylinder placed.

FIG. 3 illustrates how the bolt 2 is tightened. First, the pulling sleeve 4, having the pressing sleeve 7 with the adhering washer 11 already screwed onto it, is screwed onto the threaded end 3 of the bolt 2 until the washer 11 rests against the component 1 that is to be fixed. Subsequently, a pull bushing 24 having an internal thread is screwed onto the part of the external thread 6 of the pulling sleeve 4 that is still exposed. The pull bushing 24 is part of a hydraulic bolt-tightening cylinder 18 and is screwed on until an area of the support bushing 20 which extends around the pressing sleeve 7 is supported on the washer 11. Simultaneously, an inner toothing (not represented in detail) on a rotation bushing 21 is brought into engagement with a corresponding outer toothing 10 or the like on the pressing sleeve 7. When hydraulic liquid under pressure is supplied to the hydraulic bolt-tightening cylinder 18 via a pressure connection 19, the pull bushing 24 pulls the pulling sleeve 4 upwardly while the support bushing 20 is supported on the washer 11. In that way, the bolt is expanded or stretched to the prescribed extent, which can e.g. be determined directly my means of a marking on the pulling sleeve. At the same time, the pressing sleeve 7 is lifted upwardly and away from the component 1 that is to be fixed and can easily be screwed down, by means of a rotating drive 22, until it rests against the washer 11. When the pressure in the hydraulic bolt-tightening cylinder 18 is thereafter relieved, the expansion of the bolt 2 is retained and the hydraulic bolt-tightening cylinder 18 can be screwed off the pulling sleeve 4 and used for a further tightening procedure.

If the hydraulic bolt-tightening cylinder 18 does not comprise a rotational drive 22, the pressing sleeve 7 can be screwed down by introducing a pin through an opening 23 and inserting it into bores (not represented) in the pressing sleeve 7. The pressing sleeve 7 can then be screwed down with the aid of the pin.

A suitable hydraulic bolt-tightening cylinder for tightening the double or pulling nut comprising the pulling sleeve 4 and the pressing sleeve 7 is described in commonly owned DE 196 38 901 A1.

The specification incorporates by reference the disclosure of German priority document 103 39 201.7 filed Aug. 22, 2003 and PCT/EP2004/008477 filed Jul. 29, 2004.

The present invention is, of course, in no way restricted to the specific disclosure of the specification and drawings, but also encompasses any modifications within the scope of the appended claims.

The invention claimed is:

1. A double nut in combination with a hydraulic or pneumatic bolt-tightening cylinder for a controlled fixing of a component by means of a bolt connection, comprising:

a pulling sleeve having an internal thread extending over a complete length of the pulling sleeve, wherein said internal thread is adapted to be screwed onto a threaded end of a bolt over a complete length of the internal thread, and also having an external thread extending over the complete length of the pulling sleeve; and a pressing sleeve that is adapted to be supported on said component, wherein said pressing sleeve has an internal thread which is adapted to be screwed onto said external thread of said pulling sleeve, wherein an end of said internal thread of said pressing sleeve that faces the component engages said external thread of said pulling sleeve to such an extent that said end of said internal thread of said pressing sleeve is spaced by an axial distance equaling several revolutions of the external thread of the pulling sleeve from an end of said pulling sleeve that faces said component, wherein said external thread of said pulling sleeve is furthermore adapted to threadedly receive a pull bushing of the hydraulic or pneumatic bolt-tightening cylinder that is also provided with a support bushing that is adapted to be supported on said component and to extend over said pulling sleeve and said pressing sleeve, and wherein said pressing sleeve includes a counterbore or recess in an area in which said external thread of said pulling sleeve and said internal thread of said pressing sleeve do not inter-engage.

2. A double nut according to claim 1, wherein a washer is provided that extends about said pulling sleeve and wherein said pressing sleeve is supported on said washer.

3. A double nut according to claim 2, wherein said washer has a height that corresponds at least to an area in which said external thread of said pulling sleeve and said internal thread of said pressing sleeve do not inter-engage.

4. A double nut according to claim 2, wherein said washer magnetically sticks to said pressing sleeve.

5. A double nut according to claim 4, wherein small permanent magnets are embedded in said washer.

6. A double nut according to claim 4, wherein said washer is permanently magnetic.

7. A double nut according to claim 2, wherein said washer has a diameter that is greater than a diameter of said pressing sleeve.

8. A double nut according to claim 2, wherein said washer is provided with a countersinking having a cylindrical inner surface that extends tightly about a cylindrical outer surface of said pressing sleeve.

9. A double nut according to claim 2, wherein said washer is made of a high-strength material.

* * * * *

UNITED STATES PATENT AND TRADEMARK OFFICE

CERTIFICATE OF CORRECTION

PATENT NO. : 7,338,240 B2
APPLICATION NO. : 10/569355
DATED : March 4, 2008
INVENTOR(S) : Hohmann et al.

It is certified that error appears in the above-identified patent and that said Letters Patent is hereby corrected as shown below:

Title Page,
Item [54] should read as follows:

[54] Title: DOUBLE NUT FOR THE CONTROLLED FIXING OF A COMPONENT BY MEANS OF A BOLT CONNECTION.

Signed and Sealed this

Seventeenth Day of June, 2008

JON W. DUDAS
*Director of the United States Patent and Trademark Office*

UNITED STATES PATENT AND TRADEMARK OFFICE

CERTIFICATE OF CORRECTION

PATENT NO. : 7,338,240 B2
APPLICATION NO. : 10/569355
DATED : March 4, 2008
INVENTOR(S) : Hohmann et al.

It is certified that error appears in the above-identified patent and that said Letters Patent is hereby corrected as shown below:

Title Page,
Item [54] and Column 1, line 1-3 should read as follows:

Title: DOUBLE NUT FOR THE CONTROLLED FIXING OF A COMPONENT BY MEANS OF A BOLT CONNECTION.

This Certificate supersedes the Certificate of Correction issued June 17, 2008.

Signed and Sealed this

Twenty-second Day of July, 2008

JON W. DUDAS
*Director of the United States Patent and Trademark Office*